United States Patent [19]
Iino et al.

[11] Patent Number: 5,259,333
[45] Date of Patent: Nov. 9, 1993

[54] COMBINATION METER

[75] Inventors: Tadashi Iino; Kunimitsu Aoki; Yoshiyuki Furuya, all of Shizuoka, Japan

[73] Assignee: Yazaki Corporation, Tokyo, Japan

[21] Appl. No.: 821,446

[22] Filed: Jan. 16, 1992

[30] Foreign Application Priority Data

Feb. 6, 1991 [JP] Japan ................ 3-10351[U]

[51] Int. Cl.$^5$ ............................................. G01D 13/00
[52] U.S. Cl. .................. 116/286; 116/62.1; 116/62.4; 116/284
[58] Field of Search .......... 116/62.1, 62.4, 280, 116/284, 286, 298, 300, 301, 302, DIG. 6, DIG. 36; 368/228, 232, 233, 234, 235, 238; 73/499; 362/23, 25, 29, 30

[56] References Cited

U.S. PATENT DOCUMENTS

| | | | |
|---|---|---|---|
| 2,158,925 | 5/1939 | Braswell | 116/286 X |
| 2,502,985 | 4/1950 | Paulson | 116/286 X |
| 2,879,940 | 3/1959 | Cornell . | |
| 3,593,517 | 7/1971 | Knippler | 368/234 |
| 3,890,777 | 6/1975 | Stanish | 368/234 X |

FOREIGN PATENT DOCUMENTS

| | | | |
|---|---|---|---|
| 3940254 | 6/1991 | Fed. Rep. of Germany | 368/238 |
| 1018684 | 1/1953 | France | 368/234 |
| 2473202 | 7/1981 | France . | |

OTHER PUBLICATIONS

Patent Abstracts of Japan vol. 5, No. 157 (P-83) (829) Oct. 8, 1981.

*Primary Examiner*—William A. Cuchlinski, Jr.
*Assistant Examiner*—Willie M. Worth
*Attorney, Agent, or Firm*—Sughrue, Mion, Zinn, Macpeak & Seas

[57] ABSTRACT

A combination meter has a plurality of indicators for respectively indicating different measured amounts, in which an indicating area is reduced so as to achieve a compact design. Pointers of indicators are formed respectively by light transmitting slits provided respectively on disks. The disks are rotatably mounted in a laminated manner on a shaft concentric with these disks, and the disks are angularly moved respectively by drive sources in accordance with respective measured amounts.

5 Claims, 4 Drawing Sheets 5,259,333

COMBINATION METER

BACKGROUND OF THE INVENTION

This invention relates to a combination meter having a plurality of indicators for indicating different measured amounts, respectively, which combination meter is suited particularly for use in a vehicle.

A conventional combination meter of this type will be described with reference to FIG. 5. The combination meter has at its central portion a speedometer 11 for indicating the speed, a fuel indicator 12 for indicating the residual quantity of gasoline, and a water temperature gauge 13 for indicating the temperature of cooling water of an engine, the fuel indicator 12 and the water temperature gauge 13 being provided at the opposite sides of the speed meter 11, respectively.

The speedometer 11 has a dial plate 11a, a pointer 11b cooperating with the dial plate 11a to indicate the speed, and a self-contained device (not shown) serving as a drive source for driving the pointer 11b. The fuel indicator 12 has a dial plate 12a, a pointer 12b, and a self-contained device (not shown). The water temperature gauge 13 has a dial plate 13a, a pointer 13b, and a self-contained device (not shown).

The dial plate 11a of the speedometer 11, the dial plate 12a of the fuel indicator 12 and the dial plate 13a of the water temperature gauge 13 are masked, except for their necessary portions, with a board 14 serving as a masking member and having circular windows 141, 142 and 143.

Generally, various instruments are mounted on a dashboard of a vehicle on which the combination meter is to be mounted. Therefore, the space for accommodating the combination meter is limited, and the combination meter has been required to be of a compact construction.

In the above conventional combination meter, however, a plurality of indicators, including the speedometer 11, the fuel indicator 12 and the water temperature gauge 13, are arranged in juxtaposed relation, and therefore the indicating surface is large, and the compact design has been limited.

SUMMARY OF THE INVENTION

With the above problem of the prior art in view, it is an object of this invention to provide a combination meter in which an indicating area is reduced to thereby achieve a compact design.

To solve the above problem, the present invention provides a combination meter having a plurality of indicators for indicating different measured amounts, respectively, pointers of said indicators formed respectively by light transmitting slits provided respectively on disks; said disks rotatably mounted in a laminated manner on a shaft concentric with said disks; and said discs angularly moved respectively by drive sources in accordance with the respective measured amounts.

In the above construction, the pointers of the plurality of indicators are formed respectively by the light transmitting slits provided respectively on the disks rotatably mounted in a laminated manner on the shaft concentric with these disks, and the disks are angularly moved respectively by the drive sources in accordance with the respective measured amounts. Therefore, the indicators are not arranged in juxtaposed relation in a plane.

DETAILED DESCRIPTION OF THE PREFERRED EMBODIMENTS

Figure 1:
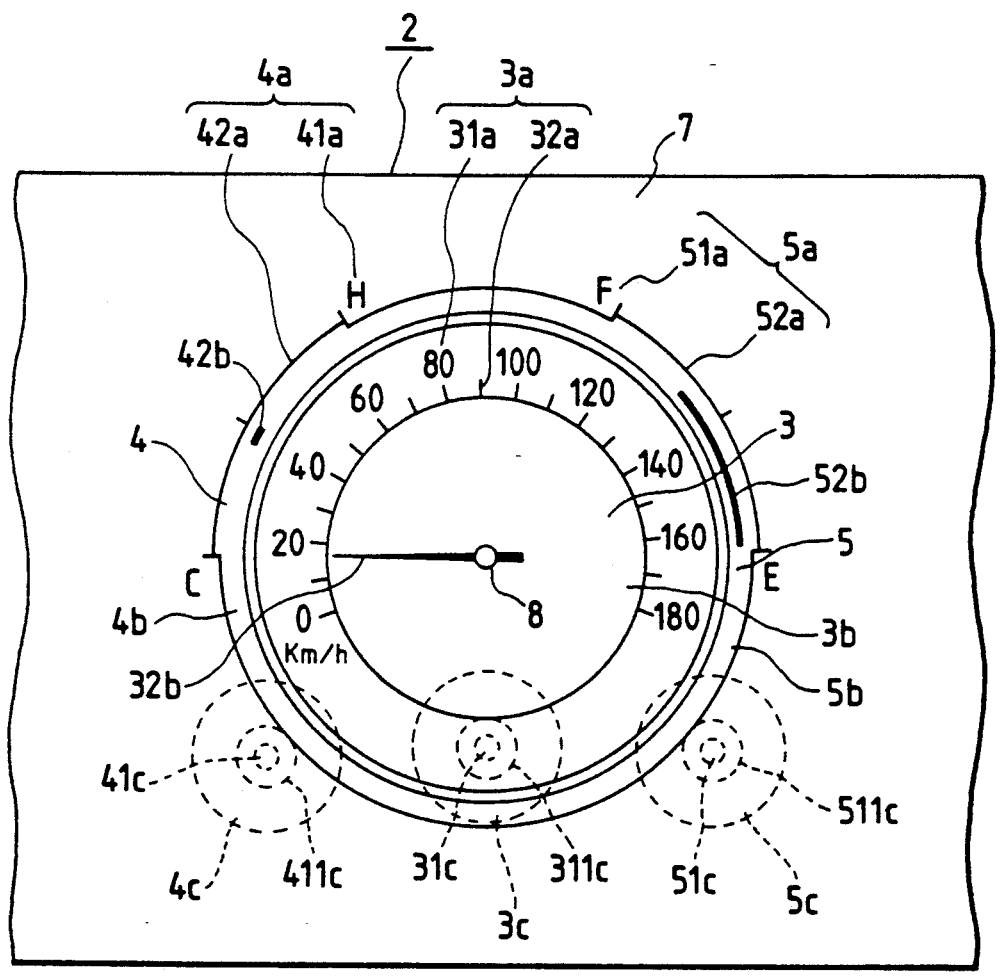
FIG. 1 is a front-elevational view of a preferred embodiment of a combination meter of the present invention.
Figure 2:
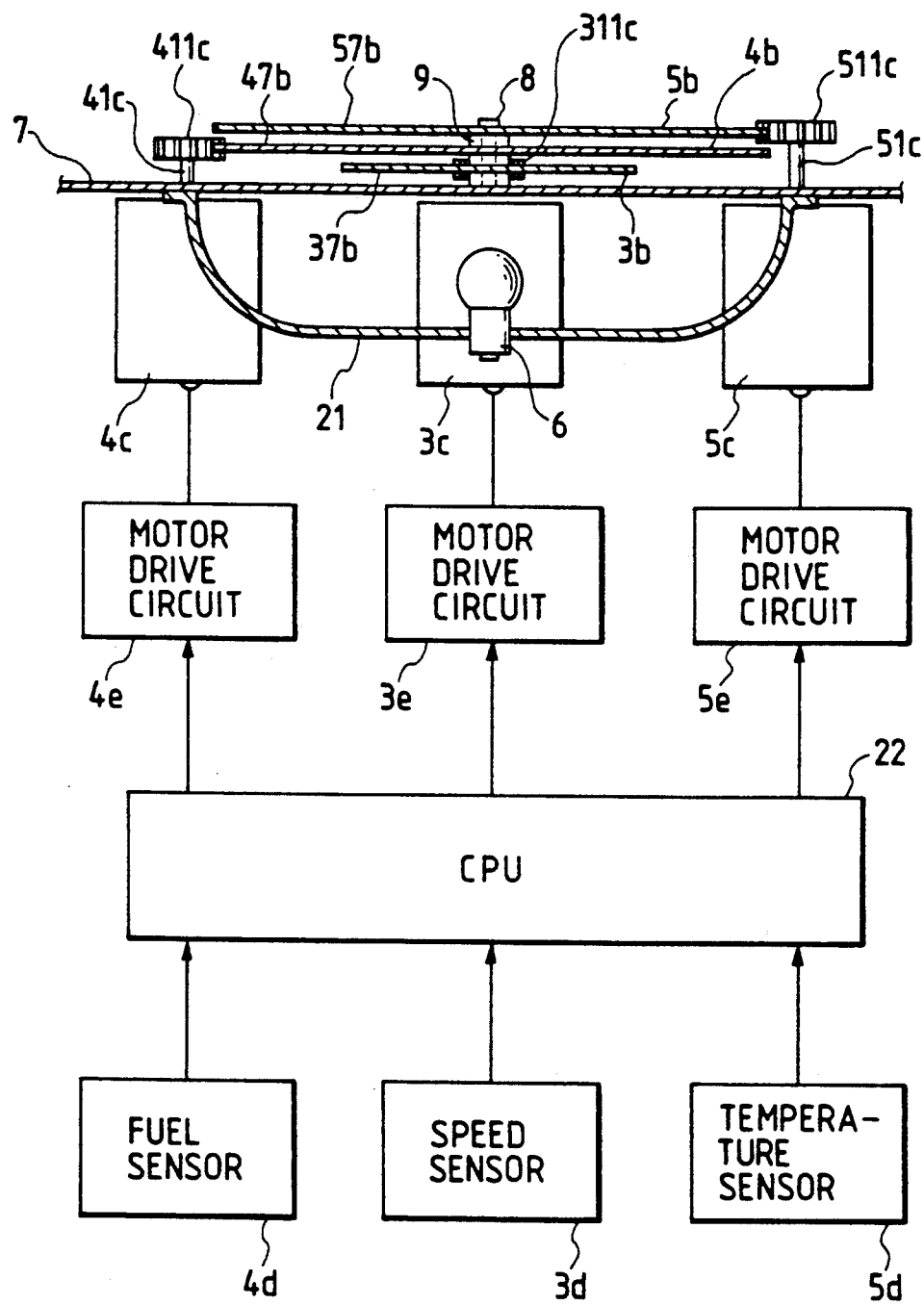
FIG. 2 is a view showing a cross-sectional structure of the combination meter of FIG. 1 and a control device.
Figure 3:
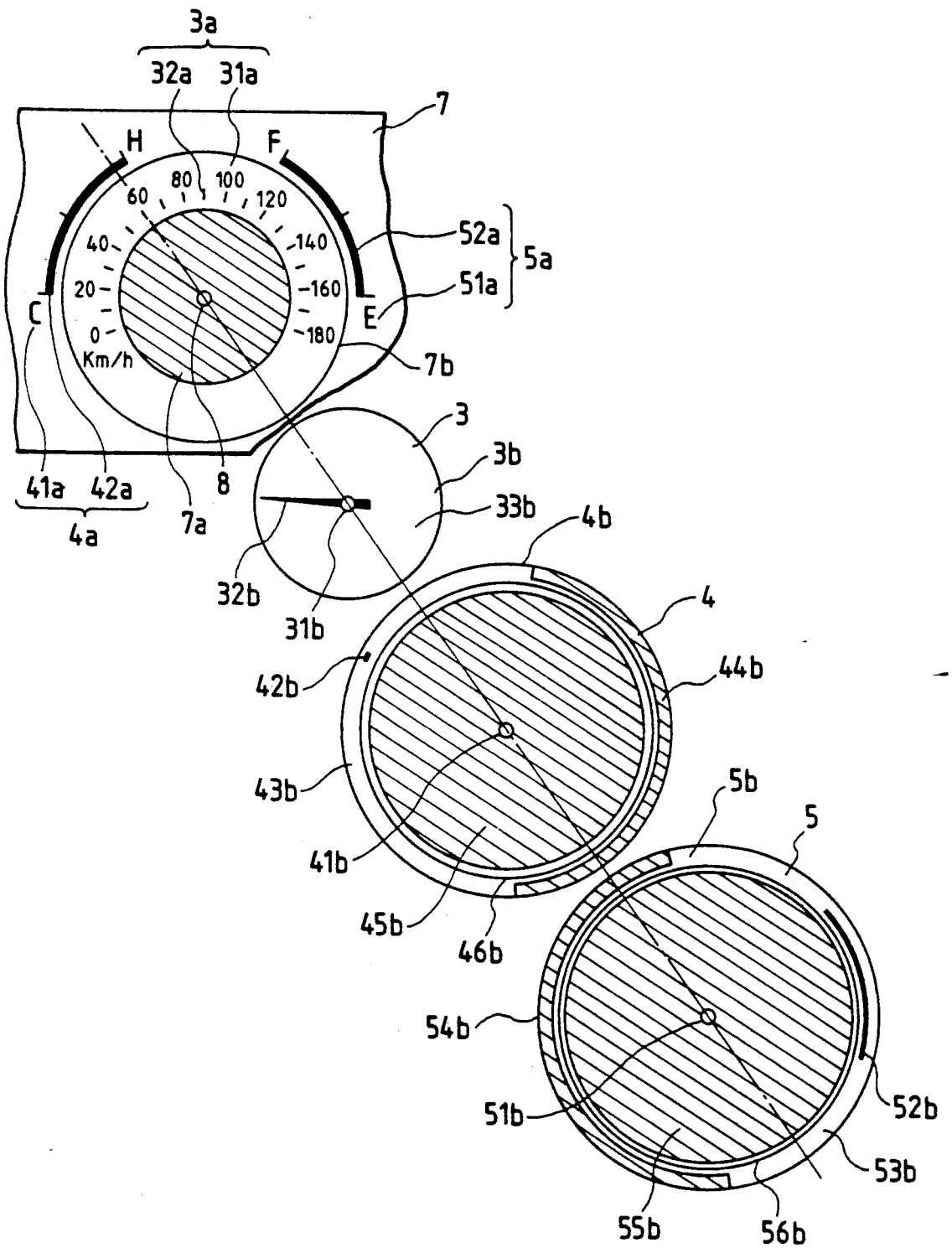
FIG. 3 is an exploded view of an important portion of the combination meter of FIG. 1.

FIG. 1 is a front-elevational view of a preferred embodiment of a combination meter of the present invention. FIG. 2 is a view showing the cross-sectional structure of the combination meter of FIG. 1 and a control device. FIG. 3 is an exploded view of an important portion of the combination meter of FIG. 1. In FIG. 3, those portions marked in black and those portions indicated by hatching are transparent portions and light-transmitting portions.

In the drawings, the combination meter 2 comprises a plurality of indicators, that is, a speedometer 3, a water temperature gauge 4 and a fuel indicator 5. The speedometer 3 has a speedometer scale portion 3a, a speedometer pointer disk 3b, and a drive motor 3c, such for example as a stepper motor, which serves as a drive source. The water temperature gauge 4 has a water temperature gauge scale portion 4a, a water temperature gauge pointer disk 4b, and a drive motor 4c, such for example as a stepper motor, which serves as a drive source. The fuel indicator 5 has a fuel indicator scale portion 5a, a fuel indicator pointer disk 5b, and a drive motor 5c, such for example as a stepper motor, which serves as a drive source.

The speedometer scale portion 3a, the water temperature gauge scale portion 4a and the fuel indicator scale portion 5a are formed on a dial plate 7 by void printing, and are arranged in a manner as shown in FIG. 3, the dial plate 7 being composed of a diffusion plate which diffuses light from a light source 6. This diffusion plate is made, for example, of a resin plate of white color. The central portion of the dial plate 7 is formed as a light transmitting portion 7a by void printing. A reflection plate 21 for reflecting the light from the light source 6 is provided at the back side of the dial plate 7.

The speedometer scale portion 3a has numerals (unit numerals) 31a representative of the speed, and a scale 32a corresponding to the numerals 31a. The numerals 31a and the scale 32a are arranged in an arc corresponding generally to the clockwise range of 8 o'clock and 4 o'clock of a dial of a watch. The water temperature gauge scale portion 4a has English characters 41a and a scale 42a, and the fuel indicator scale portion 5a has English characters 51a and a scale 52a. The scale 4a is arranged in an arc corresponding generally to the clockwise range of 9 o'clock and 11 o'clock of the dial of the watch, and the scale 5a is arranged in an arc corresponding generally to the clockwise range of 1 o'clock and 3 o'clock, and the scales 4a and 5a are disposed on a circle disposed outwardly of the speedometer scale portion 3a in concentric relation thereto. Namely, each of the scales 4a and 5a is arcuately arranged over the range of 60° with respect to the center. The speedometer scale portion 3a is separated from the water temperature gauge scale portion 4a and the fuel indicator scale portion 5a by a marginal portion 7b. A rotation shaft 8 is provided at the center of the dial plate 7, that is, the center of arcuate arrangement of the speedometer scale portion 3a. The speedometer pointer disk 3b, the water temperature gauge pointer disk 4b and the fuel indicator pointer disk 5b are rotatably mounted on the rotation shaft 8 in this order, with their central shaft holes 31b, 41b and 51b fitted on the rotation shaft 8. A spacer 9 is interposed between any two adjacent ones of these pointer disks so that they can rotate independently of one another without interfering with one another.

The speedometer pointer disk 3b is made of a disk-shaped transparent resin plate, and has a slit-like pointer 32b, and the remainder of this disk is a non-light transmitting portion 33b. The pointer 32b is formed by void printing and extends from the outer peripheral portion toward the center of the disk. The pointer 32b and the speedometer scale portion 3a cooperate with each other to indicate the speed of a vehicle. The speedometer pointer disk 3b overlaps the light transmitting portion 7a of the dial plate 7.

The water temperature gauge pointer disk 4b is subjected to void printing, so that this disk has a short slit-like pointer 42b at its outer peripheral portion, a light transmitting portion 44b over a given area of its outer peripheral portion, a transparent portion 45b overlapping the speedometer 3, and a light transmitting portion 46b overlapping the marginal portion 7b of the dial plate 7. The remainder of this disk is a nonlight transmitting portion 43b. The pointer 42b cooperates with the water temperature gauge scale portion 4a to indicate the temperature of the cooling water of the engine. The light transmitting range of the scale 42a is wider than the light transmitting range of the pointer 42b so that the light, diffused by and transmitted through the dial plate 7, can be positively incident on the pointer 42b through the scale 42a to brighten the pointer with a sufficient brightness.

The fuel indicator pointer disk 5b is subjected to void printing, so that this disk has a slit-like arcuate pointer 52b at its outer peripheral portion over a range of 60°, a light transmitting portion 54b along which the pointer 42b is movable, a transparent portion 55b overlapping the speedometer 3, and a light transmitting portion 56b overlapping the marginal portion 7b of the dial plate 7 and the light transmitting portion 46b. The remainder of this disk is a non-light transmitting portion 53b. The slit-like pointer 52b cooperates with the fuel indicator scale 5a to indicate the residual quantity of gasoline. The pointer 52b is movable along the light transmitting portion 44b. The light transmitting range of the scale 52a is similar to that of the scale portion 42a.

Toothed portions 37b, 47b and 57b are formed on the outer peripheries of the speedometer pointer disk 3b, the water temperature gauge pointer disk 4b and the fuel indicator pointer disk 5b, respectively. Pinions 311c, 411c and 511c, mounted respectively on distal ends of rotation shafts 31c, 41c and 51c of the drive motors 3c, 4c and 5c for angularly moving the speedometer pointer disk 3b, the water temperature gauge pointer disk 4b and the fuel indicator pointer disk 5b, respectively, in accordance with the respective measured amounts, are meshed with the toothed portions 37b, 47b and 57b, respectively. The drive motors 3c, 4c and 5c are provided on the back side of the dial plate 7.

The drive motors 3c, 4c and 5c are driven respectively by motor drive circuits 3e, 4e and 5e under the control of a microcomputer (CPU) 22. A vehicle speed sensor 3d for detecting the speed of the vehicle, a temperature sensor 4d for detecting the temperature of the cooling water of the engine, and a fuel sensor 5d for detecting the residual quantity of gasoline are connected to the microcomputer (CPU) 22.

The microcomputer (CPU) 22 processes detection signals from the vehicle speed sensor 3d, the temperature sensor 4d and the fuel sensor 5d to measure the vehicle speed, the temperature and the residual quantity of the fuel, and feeds electrical signals, representative of these measurement results, to the motor drive circuits 3e, 4e and 5e, respectively. Then, the drive motors 3c, 4c and 5c are driven by these motor drive circuits 3e, 4e and 5e, respectively.

With the above construction of the combination meter 2, the light from the light source 6 is projected on the back side of the dial plate 7, and is diffused by the diffusion plate constituting the substrate of this dial plate 7. Therefore, the speedometer scale portion 3a, the water temperature gauge scale portion 4a, the fuel indicator scale portion 5a and the marginal portion 7b are uniformly brightened, and also the pointers 32b, 42b and 52b of the pointer disks 3b, 4b and 5b are uniformly brightened by the light transmitted through the dial plate 7.

The speedometer pointer disk 3b, the water temperature gauge pointer disk 4b and the fuel indicator pointer disk 5b are angularly moved respectively by the drive motors 3c, 4c and 5c in accordance with their respective measured amounts. By doing so, the pointers 32b, 42b and 52b are moved respectively to those positions of the speedometer scale portion 3a, the water temperature gauge scale portion 4a and the fuel indicator scale portion 5a having the corresponding values, respectively. As a result, the vehicle speed, the residual quantity of gasoline and the temperature of the cooling water of the engine are indicated in analog form.

Figure 4:
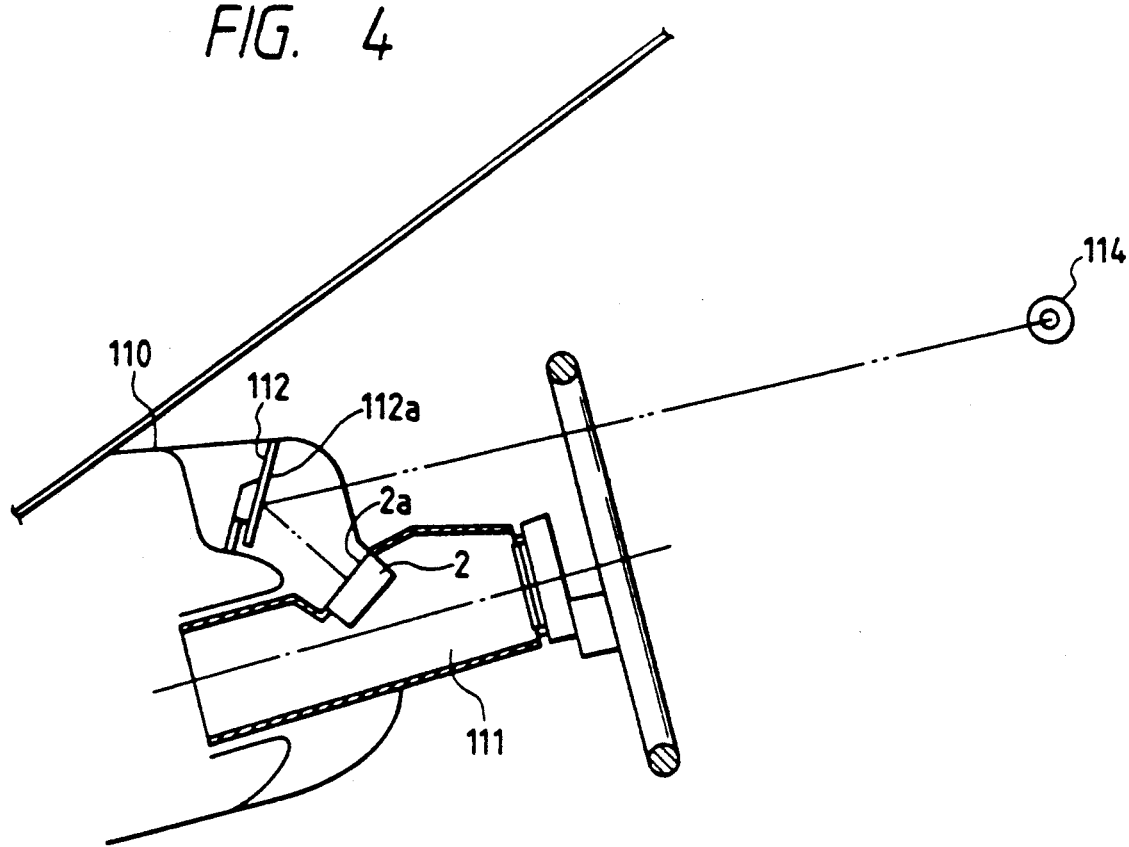
FIG. 4 is a preferred example in which the combination meter of FIG. 1 is used.
Figure 5:
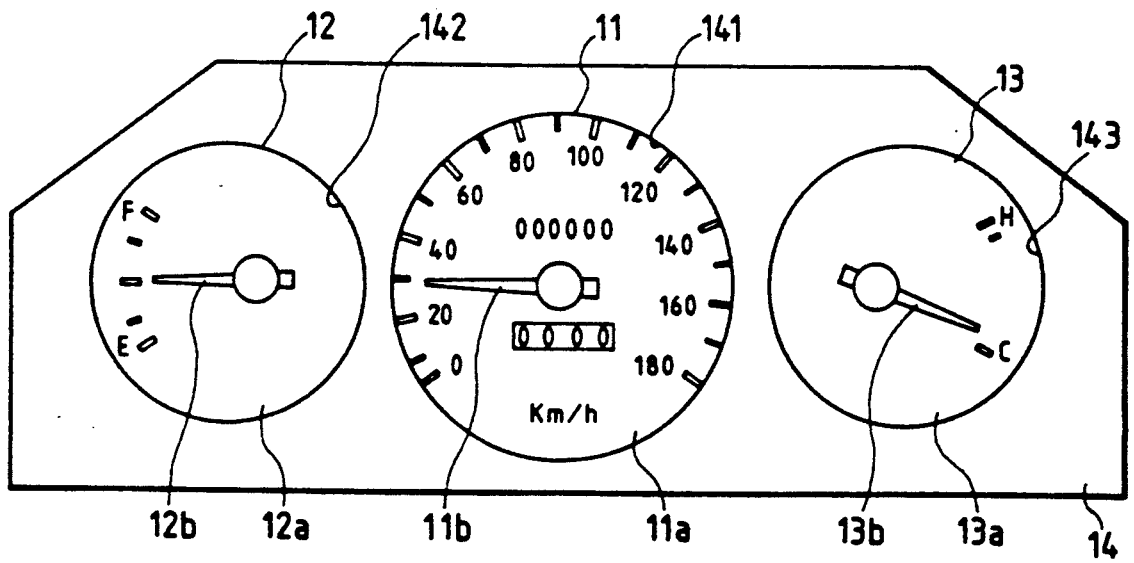
FIG. 5 is a front-elevational view of a conventional combination meter.

The above-mentioned combination meter 2 can be suitably applied to a reflective indicator device for a vehicle as shown in FIG. 4. In this Figure, the combination meter 2 is mounted on a steering wheel column 111 in such a manner that its indicating surface 2a is disposed in opposed relation to a reflection surface 112a of a reflection member 112 mounted on an instrument panel on a dashboard 110. An indicating image on the indicating surface 2a is reflected by the reflection surface 112a of the reflection member 112 toward the eyes 114 of the driver to thereby cause the driver to visually recognize the vehicle information.

Instead of the speedometer 3, or the water temperature gauge 4 and the fuel indicator 5, a tachometer for indicating the engine speed may be provided. Also, such a tachometer may be added.

As described above, in the combination meter of the present invention, the disks, having the respective light transmitting slits defining the respective pointers of the indicators, are rotatably mounted in a laminated manner on the shaft concentric with these disks, and these disks are angularly moved by the respective drive sources in accordance with the respective measured amounts. Therefore, the indicators are not arranged in juxtaposed relation in a plane, and the indicating area required for the plurality of indicators is reduced, thereby achieving the advantage that a compact design can be achieved.

Further, since the pointer of each of the indicators is formed by the light transmitting slit provided on the disk, this can be suitably applied to a reflective indicator device for a vehicle.

What is claimed is:

1. A combination meter, comprising:

a dial plate including light transmitting portions and scale portions corresponding to different operating parameters;

light means for illuminating a rear side of said dial plate;

a shaft protruding for ma front side of said dial plate;

a plurality of disks rotatably provided on said shaft in an overlapping manner, each of said disks including a light transmitting pointer portion; and operating means for individually and independently rotating said disks in response to respective measured parameters such that the respective pointer portions point to corresponding values on said corresponding scale portions, wherein light emitted from said light means is transmitted through said light transmitting portion of said dial plate and said light transmitting pointer portions of said disks.

2. A combination meter as claimed in claim 1, wherein each of said disks comprises light transmitting portion and non-transmitting portion.

3. A combination meter as claimed in claim 1, wherein said scale portions are circumferentially formed.

4. A combination meter as claimed in claim 1, wherein said dial plate comprises a diffusion plate which diffuses a light from said light means.

5. The meter of claim 1, wherein said operating means comprises:

sensor means for respectively measuring said parameters;

drive means for rotating each of said disks; and control means for controlling said driving means in accordance with the measured parameter determined by said sensor means.

* * * * *